United States Patent
Rickers et al.

(10) Patent No.: US 10,717,612 B2
(45) Date of Patent: Jul. 21, 2020

(54) SYSTEM FOR CONVEYING PASTY MATERIAL

(71) Applicant: SEEPEX GmbH, Bottrop (DE)

(72) Inventors: Sebastian Rickers, Oberhausen (DE); Stephan Mottyll, Herne (DE)

(73) Assignee: SEEPEX GMBH, Bottrop (DE)

( * ) Notice: Subject to any disclaimer, the term of this patent is extended or adjusted under 35 U.S.C. 154(b) by 0 days.

(21) Appl. No.: 16/218,543

(22) Filed: Dec. 13, 2018

(65) Prior Publication Data

US 2019/0283981 A1    Sep. 19, 2019

(30) Foreign Application Priority Data

Mar. 16, 2018 (DE) .................. 10 2018 106 228

(51) Int. Cl.
| | |
|---|---|
| *B65G 53/08* | (2006.01) |
| *B65G 33/08* | (2006.01) |
| *B65G 33/26* | (2006.01) |
| *B65G 53/48* | (2006.01) |
| *F04C 2/16* | (2006.01) |
| *F04C 13/00* | (2006.01) |
| *F04C 28/24* | (2006.01) |
| *F04C 2/107* | (2006.01) |
| *B65G 53/52* | (2006.01) |

(52) U.S. Cl.
CPC ............ *B65G 53/08* (2013.01); *B65G 33/08* (2013.01); *B65G 33/265* (2013.01); *B65G 53/48* (2013.01); *B65G 53/525* (2013.01); *F04C 2/1073* (2013.01); *F04C 2/16* (2013.01); *F04C 13/002* (2013.01); *F04C 28/24* (2013.01); *B65G 53/526* (2013.01)

(58) Field of Classification Search
CPC ...... B65G 53/08; B65G 53/48; B65G 53/525; B65G 33/14; B65G 33/16; B65G 33/18; F17D 1/16; F17D 1/17
USPC ............. 406/46, 47, 48, 50, 56, 61, 85, 197; 137/807, 825, 826
See application file for complete search history.

(56) References Cited

U.S. PATENT DOCUMENTS

| | | | | |
|---|---|---|---|---|
| 3,072,442 A | * | 1/1963 | Ferrari | G01N 35/08 406/46 |
| 3,099,495 A | * | 7/1963 | Ponndorf | B65G 53/08 406/30 |
| 3,377,107 A | * | 4/1968 | Hodgson | B65G 53/30 406/47 |

(Continued)

FOREIGN PATENT DOCUMENTS

| | | |
|---|---|---|
| DE | 559237 B | 9/1932 |
| DE | 874877 B | 5/1953 |

(Continued)

*Primary Examiner* — Joseph A Dillon, Jr.
(74) *Attorney, Agent, or Firm* — Andrew Wilford

(57) ABSTRACT

A system for conveying pasty material through a conduit has an eccentric screw pump having a stator, a rotor that rotates in the stator, a housing with an intake port, and an output port connected to the conduit. A drive rotates the rotor and thereby draws the pasty material in through the intake port and expels the drawn-in material as a compressed-material strand into the conduit. A valve supplies gas pulses to the conduit at time intervals for separating the compressed-material strand into material plugs of limited length traveling through the conduit.

18 Claims, 3 Drawing Sheets

(56) References Cited

U.S. PATENT DOCUMENTS

| | | | | |
|---|---|---|---|---|
| 3,712,681 A * | 1/1973 | Marino | | B65G 53/08 406/48 |
| 4,116,368 A * | 9/1978 | Smith | | E04G 23/0203 222/145.5 |
| 4,184,793 A * | 1/1980 | Blatrix | | B65G 53/48 406/61 |
| 4,211,506 A * | 7/1980 | List | | C07C 63/26 406/55 |
| 4,273,267 A * | 6/1981 | Conca | | B29C 45/1816 198/580 |
| 4,286,935 A * | 9/1981 | Okuno | | B65G 53/08 264/148 |
| 4,801,210 A * | 1/1989 | Gian | | B01F 13/10 366/10 |
| 4,909,676 A * | 3/1990 | Heep | | B65G 53/521 406/11 |
| 4,945,661 A * | 8/1990 | Kuioka | | E02F 3/88 37/189 |
| 5,791,829 A * | 8/1998 | Iltzsche | | B65G 53/525 406/50 |
| 5,836,722 A * | 11/1998 | Lacchia | | B05B 7/144 406/122 |
| 5,871,081 A * | 2/1999 | Gaalswyk | | B65G 33/18 198/502.4 |
| 5,947,645 A * | 9/1999 | Rixom | | B01F 7/30 222/58 |
| 5,953,567 A * | 9/1999 | Muramatsu | | G03G 15/0822 222/DIG. 1 |
| 6,287,056 B1 * | 9/2001 | Szikszay | | B65G 53/12 406/127 |
| 8,439,659 B2 | 5/2013 | Loeker | | |
| 8,573,895 B2 * | 11/2013 | Hilgraf | | B63B 27/20 406/124 |
| 8,764,420 B2 | 7/2014 | Overmeier | | |
| 9,604,794 B2 * | 3/2017 | Hauser | | B65G 53/48 |
| 9,617,086 B2 * | 4/2017 | Rusterholz | | B65G 53/525 |
| 2005/0155845 A1 * | 7/2005 | Webb | | B65G 33/18 198/663 |
| 2011/0033248 A1 * | 2/2011 | Hilgraf | | B63B 27/20 406/56 |
| 2011/0061403 A1 | 3/2011 | Jun | | |
| 2011/0110810 A1 * | 5/2011 | Burke | | B30B 9/125 418/5 |
| 2011/0271649 A1 * | 11/2011 | Tetzlaff | | B65G 53/48 53/474 |
| 2015/0375942 A1 * | 12/2015 | Mellander | | B30B 9/127 198/617 |
| 2017/0268505 A1 | 9/2017 | Dicks | | |
| 2017/0306760 A1 | 10/2017 | Overmeier | | |

FOREIGN PATENT DOCUMENTS

| | | |
|---|---|---|
| DE | 3319076 A | 12/1983 |
| DE | 4203571 A | 8/1993 |
| DE | 102008037440 B | 10/2009 |
| WO | 2001002274 A | 1/2001 |

* cited by examiner

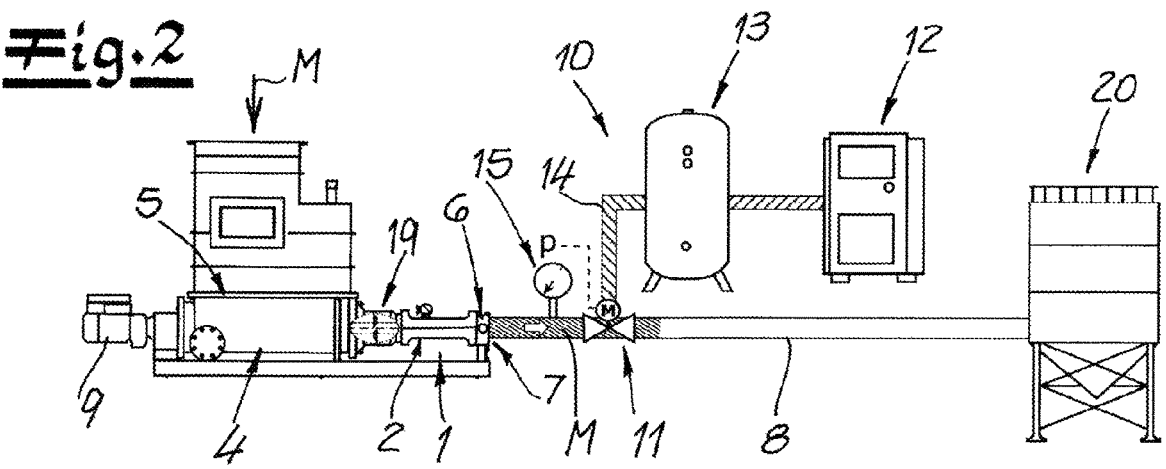
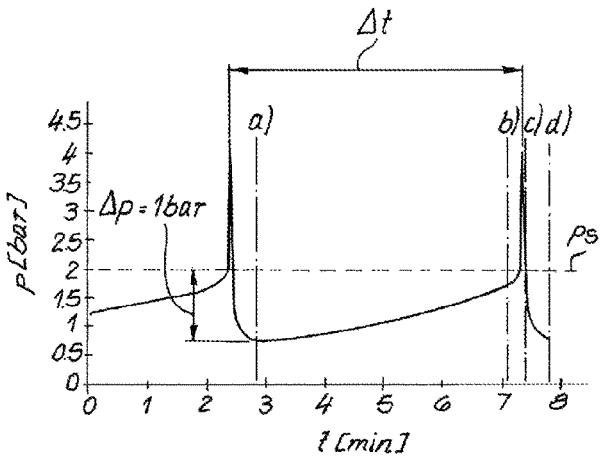
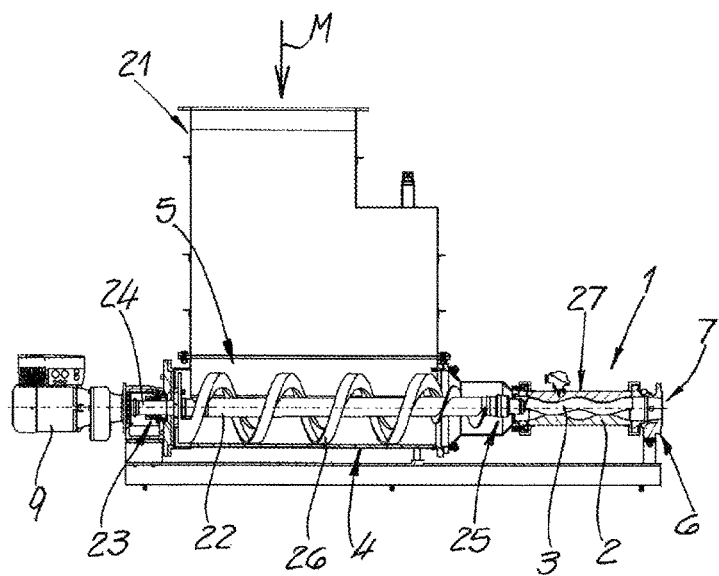

SYSTEM FOR CONVEYING PASTY MATERIAL

FIELD OF THE INVENTION

The present invention relates to a transport or conveying system. More particularly this invention concerns such a system for moving a pasty or highly viscous fluent material through a conduit.

BACKGROUND OF THE INVENTION

A conveying system for pasty material such as sludge or comminuted food waste or the like typically has an eccentric screw pump having a stator, a rotor that rotates in the stator, a suction housing forming an intake port at a low-pressure side of the stator, and preferably a pressure housing with output port that is connected to the a high-pressure side of the stator.

Such an eccentric screw pump is from the group of rotary displacement pumps that are used to convey a wide variety of media and in particular highly viscous liquids in a wide variety of industrial sectors, with the media or liquids to be conveyed often having high solids contents. In the context of the present invention, the eccentric screw pump is used to convey pasty material and thus highly viscous liquids with (high) solids contents.

The stator is made of elastic or elastomeric material, for example, and is usually surrounded by a one-piece or multipart stator casing or stator housing. The eccentric screw pump has a drive for the rotor and preferably a coupling rod in the suction housing that is preferably connected via a drive-side joint to a drive-side shaft and via a rotor-side joint to the rotor, with the coupling rod allowing eccentric rotation of the rotor. An eccentric screw pump is preferably constructed as a hopper pump in which a feed hopper is connected to the intake port. In such an embodiment for conveying pasty or highly viscous media with solids content, the coupling rod is preferably equipped with conveying tools, for example with an auger or with conveyor paddles promoting transport of the material from the intake port to the rotor.

In practice, there is a need to transport pasty material or media such as dewatered sludge, for example, over long distances, and this poses great challenges to local wastewater treatment, for example, since a substantial pressure drop in the conduit caused by the high viscosity and abrasiveness of this material/medium must be overcome. These pressure losses scale proportionally over the length of the conveying route, which makes conveyance over distances in the range of kilometers extremely difficult. The commonly used pump solutions must build up high pressure in order to overcome the pressure losses, so that they are limited by their pressure rating to a maximum conveying distance. In addition, high back pressure places an extreme load on the pumps, resulting in frequent, time-consuming, and expensive maintenance cycles due to wearing of the rotor-stator structures and/or the joints. When eccentric screw pumps are used for such long conveying routes, commensurately large, heavy-duty eccentric screw pumps must be used with considerable maintenance and associated costs.

Alternatively, sequential conveyance solutions with multiple drives such as conveyor belts or augers are used in practice. Disadvantages include high energy consumption and maintenance costs, and an open design is often associated with corresponding odor nuisance or rewatering dried sludge by rain. Such conveyance solutions are also inefficient for vertical or angled transport. The use of closed piping usually requires the use of multistage eccentric screw pumps or, alternatively, piston pumps, that are suitable for high-viscosity media and high pressures; however, due to the high back pressure, they require a relatively high drive power and are thus associated with high energy consumption and high maintenance.

Pneumatic conveyance and so-called plug conveyance in particular are also known from practice, but these are mainly used to transport loose bulk materials. Such a method and device for the pneumatic conveyance of bulk material is known for example from WO 2001/002274. The bulk material is to be conveyed from a low to a high level, with the bulk material being first conveyed substantially horizontally, then pneumatically raised and subsequently conveyed pneumatically. The initial conveyance occurs in the form of discrete plugs of bulk material, and the bulk material is lifted in the form of a largely continuous flow of bulk material.

A conveyor system with a pipeline for the transport of short, similar fluent plugs of a granular or powdery material is also known for example from DE 33 19 076. This system consists of a conduit and branch lines parallel thereto. In addition, a feeder, for example a pumps, is provided that has a seal against a pipeline pressure caused by a fluid pressure source. In principle, the feeder can also be an eccentric screw pump with rotor and stator. In any case, the pump is downstream from a material-holding chamber at the upstream end of which a connection for the fluid pressure source is provided so that fluid pressure can be applied continuously to the conduit via the holding chamber on the intake side. In addition, at least one opening for allowing entry of a small quantity of the fluid into the conduit is provided in the subsequent conduit for material plug transport. When using an eccentric screw pump, it is also proposed to that a cellular wheel sluice be provided at the downstream-end holding chamber whose intended purpose is not only to better seal the pump against the prevailing pressure in the conduit, but also to reduce the size of the material emerging from the pump.

In addition, devices for conveying moist and mushy material in pipelines in terms of a plug transport are known from DE 874 877 and DE 559 237.

Finally, DE 42 03 571 describes a mobile device for producing lightweight concrete with a screw mixer and a screw pump to which a pressurized chamber of a compressed air mixing and conveying machine is connected via a connecting line.

OBJECTS OF THE INVENTION

It is therefore an object of the present invention to provide an improved conveying system for pasty material.

Another object is the provision of such an improved conveying system for pasty material that overcomes the above-given disadvantages, in particular that allows for proper and efficient conveyance of pasty material over long distances with a cost-effective and low-maintenance construction.

SUMMARY OF THE INVENTION

A system for conveying pasty material through a conduit has according to the invention an eccentric screw pump having a stator, a rotor that rotates in the stator, a housing with an intake port, and an output port connected to the conduit. A drive rotates the rotor and thereby draws the pasty material in through the intake port and expels the drawn-in material as a compressed-material strand into the conduit. A valve supplies gas pulses to the conduit at time intervals for separating the compressed-material strand into material plugs of limited length traveling through the conduit.

The pressure medium is preferably compressed air. Consequently, it is preferable that the device for generating the compressed-air pulse have a compressor or a blower.

The invention proceeds in this regard from the discovery that, by combining an eccentric screw pump and so-called pneumatic dense-phase conveyance, pasty material, that is, highly viscous liquids or media, can be transported economically and efficiently even over long distances without the need to use particularly large eccentric screw pumps. The material is pressed by the eccentric screw pump directly into the conveyor line to form a compressed (continuous) material strand. The supplier of pressure medium integrated into the conduit injects compressed-air pulses into the conduit at intervals and the material strand is separated into material plugs and these (spaced-apart) material plugs are transported in the conveyance direction by the compressed-air pulses and/or the pressure arising in the conduit. The conduit is not permanently loaded with pressure medium (for example compressed air); instead, only the described compressed-air pulses are generated in the conduit and, due to the construction, the compressed-air pulses act in principle both in and opposite to the conveyance direction and hence toward the pump. However, since the eccentric screw pump is characterized by a closed sealing line and the material from the eccentric screw pump is compressed and thus pressed under pressure into the conduit, the compressed-air pulses entering the conduit can only "give way" in the conveyance direction and thus transport the resulting material plugs, with support from the effect of the eccentric screw pump, in the conveyance direction.

Moreover, it lies within the scope of the invention to provide not only one supplier of pressure medium, more particularly to inject a pressure medium into the conduit at not only one point or by one valve, but also to provide the optional possibility of injecting compressed-air pulses at a plurality of points and, in particular, at a plurality of points distributed over the length of the conduit via a plurality valves distributed for example over the length of the conduit.

A pressure sensor is preferably connected to the conduit. In addition, the system preferably has a controller that is preferably connected to the valve of the supplier of pressure medium on the one hand and to the pressure sensor on the other hand, so that the valve can be controlled by the controller as a function of the pressure measured in the conduit by the pressure sensor. During operation, the pasty material is thus forced by the eccentric screw pump into the pressure line, so that the pressure measured in the conduit by the pressure sensor gradually increases. Upon reaching or exceeding a predetermined pressure threshold, which can for example be stored in the controller, the valve is opened and the compressed-air pulse injected in this manner into the conduit separates the material plug and conveys it through the conduit in the conveyance direction. During injection of the pressure medium, the pressure increases briefly but then decreases again immediately on separation of the sludge plug. The renewed continuous feeding of the material by the eccentric screw pump, (slowly) increases the pressure in the conduit again until another injection of pressure medium occurs.

Depending on the properties of the pasty material to be conveyed, it can be advantageous to support the conveyance aby simultaneous injection of lubricant in order to reduce pipe friction and thereby permanently reduce the pressure in the entire conduit to a very low pressure level, for example below 5 bar, preferably below 4 bar. The use of such a lubricant is advantageous when conveying sludge and particularly dried sludge. For this purpose, a lubricant feeder is connected to the conduit, preferably between the eccentric screw pump and the supplier of pressure medium (the mouth of the feeder to the conduit). With this lubricant feeder (upstream of the supplier of pressure medium), it is preferably possible to continuously (or quasi continuously) inject a lubricant into the pressure line adjacent the material strand. In this way, the material and thus the material plug is also coated with a lubricant, thereby reducing pipe friction for dense-phase conveyance and optimizing the energy efficiency of the overall system. The lubricant can for example be a known polymer solution. Alternatively however, water can also be used as a lubricant. Moreover, it is possible to inject the lubricant such that it is distributed over the inner surface of the conduit, for example by a plurality of injection points that are distributed over the surface, so that a comprehensive lubricant layer, more particularly a lubricant layer (boundary layer) that surrounds the material plug, is produced.

The combination of (eccentric screw) pump conveyance and pneumatic dense flow conveyance drops the pressure in the entire conduit permanently to a very low level. This pressure level results directly from the force required to initially move the material plug. Once the static friction is overcome, the material plug is accelerated by the inflowing and expanding compressed air (pressure medium), which causes the pressure level in the line to drop again. Optionally, the maximum pressure level in the line can be influenced by varying the amount of lubricant (for example polymer solution) used as well as the length and/or weight of the material plug, which enables an operating point that is optimal in terms of energy engineering to be set during startup.

In principle, it also lies within the scope of the invention if no additional lubricant feeder is used, particularly if the material used permits this. For example, during the conveyance of comminuted food waste, which also comes into consideration according to the invention, lubricants can also be dispensed with due to the good frictional properties.

An eccentric screw pump is preferably a hopper pump, in which case a feed hopper is connected to the intake port. In the case of such a hopper pump, the coupling rod extending between the drive and rotor allowing the eccentric movement is equipped with conveying tools, for example with an auger, or with paddles or the like.

The inventive combination of pump conveyance and pneumatic dense-phase conveyance (optionally with simultaneous lubricant injection) can permanently lower the pressure in the entire conduit as mentioned previously to a very low level, for example below 5 bar, preferably below 4 bar. Based on this, in an especially preferred embodiment, the invention proposes the use of correspondingly small, maintenance-optimized eccentric screw pumps. These are eccentric screw pumps in which the elastic stator can be exchanged easily and quickly without removing the suction housing and without removing the pressure housing, and/or in which the rotor can be exchanged easily and quickly without removing the suction housing and without removing the pressure housing, preferably without the use of additional equipment. Such maintenance-optimized pumps are generally designed in practice for relatively low pressures. The concept according to the invention, according to which the pressure level in the conduit is limited to relatively low values, now makes it possible to use precisely such maintenance-optimized pumps, so that the combination of such an eccentric screw pump with the pneumatic dense-phase conveyance as plug conveyance is given particular importance. The low pressure level increases the service life of the components, allowing maintenance intervals to be lengthened due to lesser stress on the components. The maintenance costs are reduced as well, because stator changes and/or rotor changes can generally be performed in a short time without pipe disassembly and without additional lifting and crane systems.

For easy changing of the stator and/or rotor, an eccentric screw pump that merits particular consideration has an (elastic) stator that is a longitudinally divided and consists of at least two partial stator casings. The stator casing surrounding the elastic stator can, as a longitudinally divided casing, consist of a plurality of casing segments that optionally form a stator clamping device for the elastic stator. Such an eccentric screw pump is known, for example, from DE 10 2008 021 920, U.S. Pat. No. 8,764,420, US 2017/0268505, or US 2017/0306760. Preference can be given to such eccentric screw pumps. For easy exchanging of the rotor, a preferred embodiment is proposed in which the rotor can be replaced independently of the joints of the coupling rod, for example by virtue of the rotor being detachably connected to the coupling joint via a detachable separation point (see DE U.S. Pat. No. 8,764,420, for example).

In principle, however, pumps of other types and maintenance-optimized pumps of other types can also be considered in the context of the invention.

Optionally, the eccentric screw pump can be equipped with a comminuter for the material. This is advantageous if the material that is supplied to the eccentric screw pump has to be comminuted before the compressed air conveyance and possibly before being transported through the pump. Such a comminuter, which is also referred to as a macerator, can be integrated into the eccentric screw pump and preferably arranged upstream of the stator/rotor, for example.

The invention also relates to a method for conveying a pasty material by a system of the described type, wherein the material is compressed by the eccentric screw pump to form a compressed-material strand in the conduit, and compressed-air pulses are injected at time intervals into the conduit by the supplier of pressure medium, so that the material strand is separated into (spaced-apart) material plugs that are transported in the conduit in the conveyance direction. The compressed-air pulses are preferably generated as a function of the pressure in the conduit, for example upon reaching or exceeding a predetermined pressure threshold, which can be 1 bar to 3 bar, for example about 2 bar. The compressed-air pulses preferably have a duration of about 1 to 20 seconds. It is possible to generate compressed-air pulses each with a predetermined, constant duration. In principle, however, it is also possible to variably control the duration of the compressed-air pulses as a function of the pressure in the conduit. A lubricant can be optionally injected into the conduit, with the amount of lubricant injected being preferably controlled as a function of the pressure in the conduit.

Overall, it is advantageous to control the system such that the pressure in the conduit does not exceed an upper limit, for example 5 bar, preferably 4 bar. The eccentric screw pump and the supplier of pressure medium and, optionally, the lubricant supply can be controlled accordingly for this purpose. Overall, an operating point that is optimal in terms of energy engineering can be set. It is also interesting to note that the amount of compressed air used can be minimized because the generation of compressed air is not a negligible cost factor in such a process. It is then possible to optimize the operation in terms of cost, taking the various factors into account (eccentric screw pump, supplier of pressure medium, lubricant feeder).

Overall, pasty media can be transported over long distances by the invention. The length of the conduit is preferably greater than 25 meters, for example greater than 50 meters, particularly greater than 100 meters, especially preferably greater than 200 meters. Storage, such as a silo or the like, can be connected to the end. The lowering of the pressure level to the described values makes it possible to use the above-described easy maintenance pumps. Moreover, due to the low pressure level, wear can be reduced, thus increasing component life and extending maintenance cycles. The space requirement of the individual components is low. Also, the operating costs are low due to the low energy consumption, the long maintenance cycles, and the inexpensive spare parts. In addition, total investment costs can be reduced because, by virtue of the low pressure level, cost-effective piping, i.e. with thinner walls and cheaper pipelines, can be used. An automated system, including process monitoring, can be implemented that can be integrated into the existing automation and control systems via common bus interfaces. Furthermore, there are occupational safety benefits due to the lower part weight, resulting in fewer people being needed for maintenance. For small pumps, maintenance can be performed by a single person without additional lifting or crane equipment.

BRIEF DESCRIPTION OF THE DRAWING

The above and other objects, features, and advantages will become more readily apparent from the following description, reference being made to the accompanying drawing in which:

FIG. 2 is a small-scale side schematic view of a modified embodiment of the inventive system;

FIG. 3 is an operating diagram of a system according to FIGS. 1A to 1D showing pressure in the conduit as a function of time; and FIG. 4 is a sectional detail view of an eccentric screw pump of the system according to FIGS. 1A to 1D.

SPECIFIC DESCRIPTION OF THE INVENTION

Figure 1A:
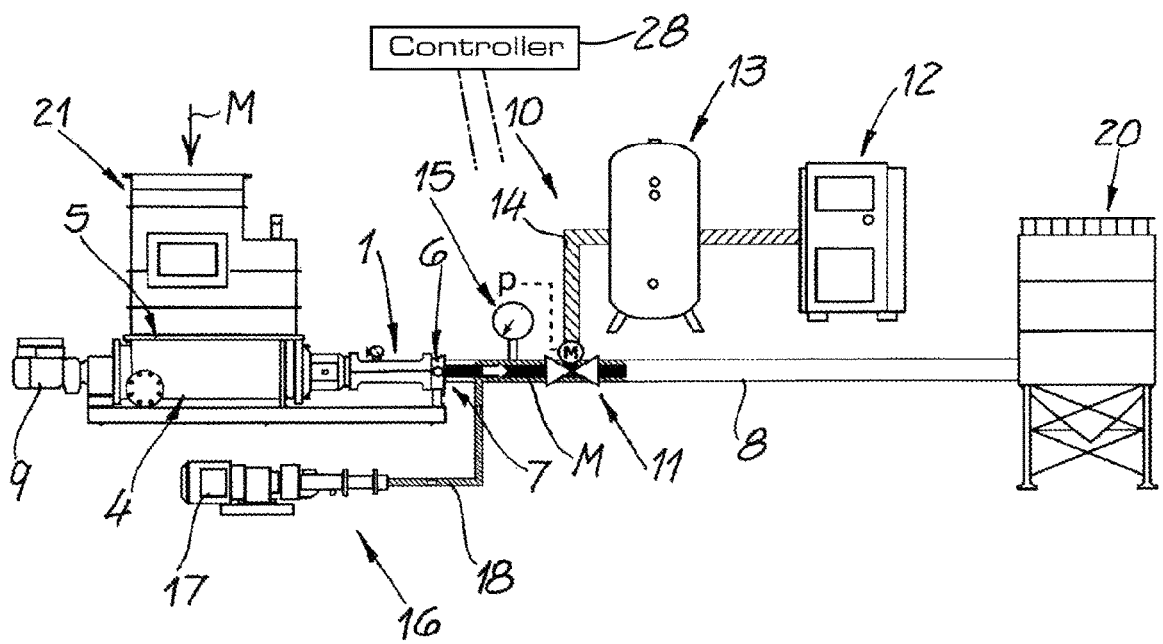
FIGS. 1A-1D are small-scale side schematic views of the system of this invention in successive operational states.

FIGS. 1A-1D show a conveying system for pasty material, for example dewatered sludge and FIG. 2 shows such a system that can be used for conveying pasty material M in for example the form of comminuted food waste.

The system has as best shown in FIG. 4 an eccentric screw pump 1 having a stator 2 made of elastic material and a rotor 3 that rotates in the stator 2. Furthermore, the eccentric screw pump 1 has a suction housing 4 forming an intake port 5 at a low-pressure side to the stator and a pressure housing 6 with an output port 7 on the high-pressure side to the stator. The pump is provided with a drive 9 for the rotor 3. Further details of the construction of such an eccentric screw pump 1 will be explained below with reference to FIG. 4.

The system also has a pneumatic conduit 8 that is (directly) connected to the output port 7 of the eccentric screw pump 1. This conduit 8 is connected to the output port 7 or to the pressure housing 6 such that the material M to be conveyed is forced by the eccentric screw pump 1 into the conduit as a compressed-material strand. A supplier 10 of pressure medium is also connected via a valve 11 to the conduit 8 here formed as a compressed air feed 10, with the compressed-air pulses being injectable into the conduit 8 at time intervals. With these compressed-air pulses, the compressed-material strand is separated into material plugs MP of limited length that are transported through the conduit 8. This will be discussed below in greater detail. Storage, for example a silo 20, is connected to the end, so that the material M that is fed to the eccentric screw pump 1 is conveyed through the eccentric screw pump 1 and the conduit 8 into the silo 20, particularly over a relatively long transport route of for example more than 100 meters.

A pressure sensor 15 is also connected to the conduit 8. Both the pressure sensor 15 and the compressed-air valve 11 are preferably connected to a controller 28 (not shown). The supplier 10 of pressure medium can have a compressor 12, a pneumatic surge chamber 13, and a compressed-air line 14.

In addition, in the embodiment according to FIGS. 1A to 1D, a lubricant feeder 16 comprising a pump 17 and a line 18 is connected to the conduit 8. The lubricant feeder, more particularly the connection of the lubricant feeder 16 to the conduit, is between the eccentric screw pump and the compressed-air feed 10, more particularly the connection of the compressed-air feed 10 to the conduit 8. With the aid of this lubricant feeder 16, a lubricant, for example a polymer solution, is injected into the pressure line 8, more particularly around the material strand.

In the illustrated embodiment, the eccentric screw pump 1 is a hopper pump, with a feed hopper 21 connected to the intake port 5. Details are shown in FIG. 4, which will be discussed below.

Figure 1B:
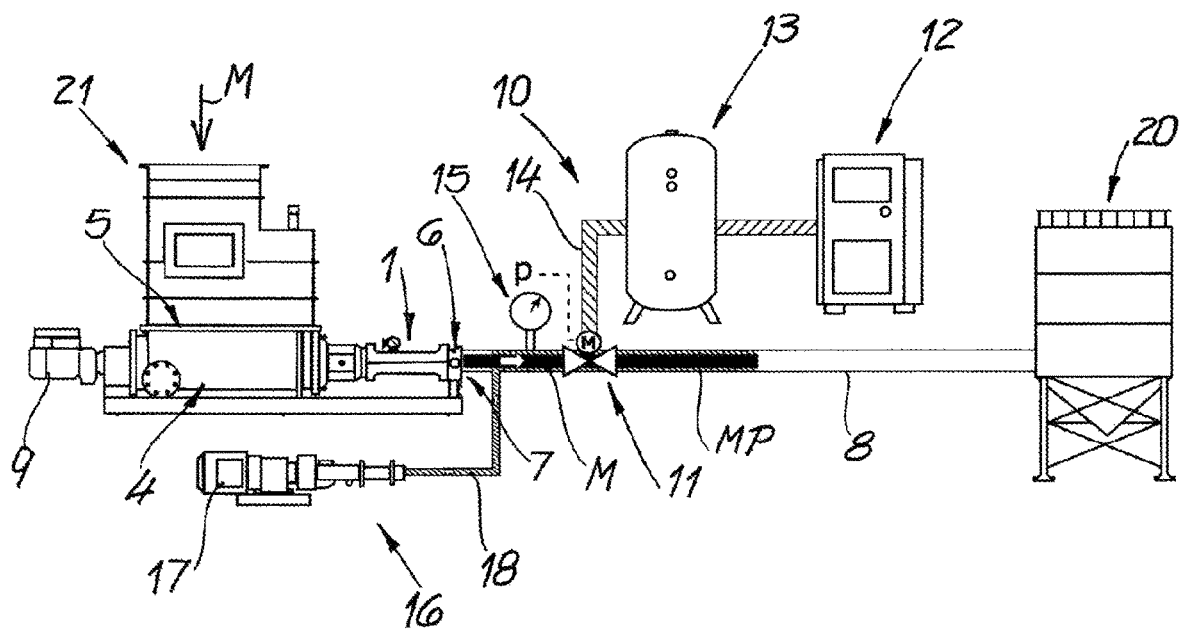
Figure 1C:
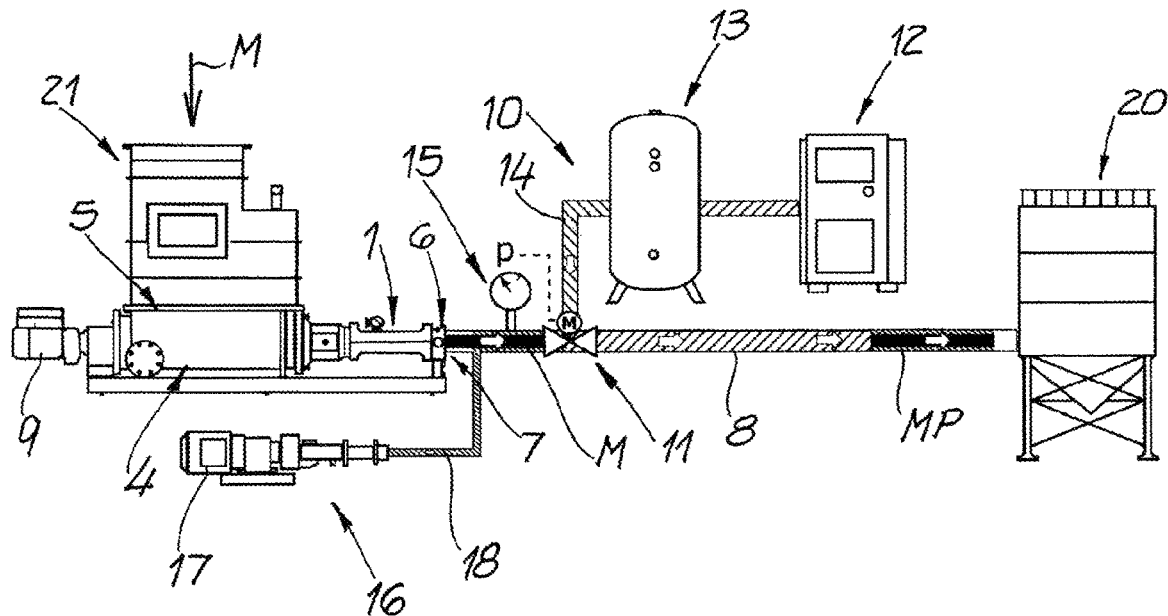

The system according to FIGS. 1A to 1D is for example operated as follows:

The eccentric screw pump 1 is charged via the hopper 21 with the material to be conveyed, for example dewatered sludge. The sludge M is pumped by the hopper pump 1 into the conduit or pressure line 8 (see FIG. 1A). At the same time, a lubricant, for example a polymer solution, is (continuously) supplied to the conduit by the lubricant feeder 16. In the course of the compressed feeding of the sludge into the conduit 8, the pressure that is monitored in the conduit 8 by the pressure sensor 15 gradually increases. When a predefined pressure threshold value is reached or exceeded (FIG. 1B), a compressed-air pulse is injected into the conduit 8 by opening the valve 11, and a material plug MP of limited length is thereby separated from the compressed-material strand and transported through the conduit 8 (FIG. 1C). A comparative examination of FIGS. 1C and 1D suggests that, as a result, the pressure in the conduit drops again and the above-described process begins again with FIG. 1A.

Figure 1D:
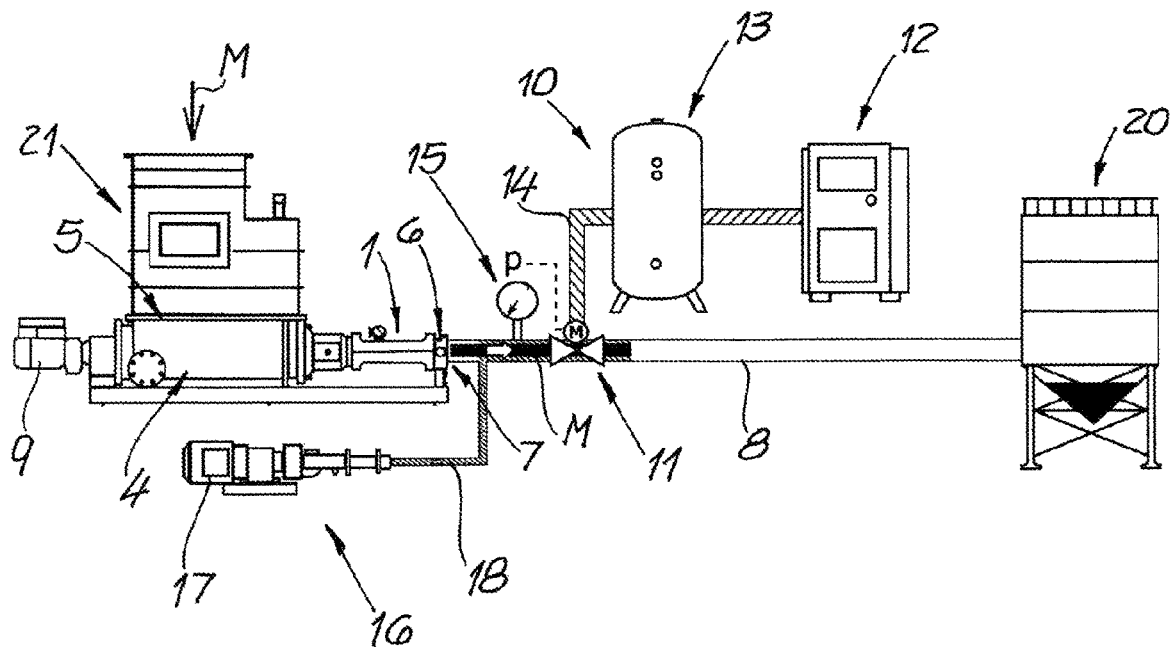

The functionality can also be clarified with reference to FIG. 3 that graphically illustrates the pressure profile at the upstream end of the conduit 8. The diagram shows the pressure p in the conduit measured by the pressure sensor 15, i.e. at the compressed-air feed 10, particularly as a function of the time t. Beginning at time 0, it can be seen at first how the pressure p rises as the material is pumped into the conduit 8 according to FIG. 1A and (after a little more than two minutes) reaches the pressure threshold value ps (FIG. 1B). At this time, the compressed-air pulse is injected, so that the pressure p abruptly increases to a value of about 4 bar and then immediately drops back to a value well below the pressure threshold ps (FIGS. 1C and 1D). In the illustrated embodiment, the pressure p in the line 8 drops by about 1 bar below the pressure threshold. A new sludge plug is then fed into the line over a period of a few minutes by the eccentric screw pump until another compressed air injection takes place. The states shown at a), b), c), and d) in FIG. 3 correspond to the states shown in respective FIGS. 1A to 1D.

In the embodiment according to FIGS. 1A to 1D a lubricant is injected in order to reduce the pipe friction for conveying dense phases and thus improve the energy efficiency of the overall system.

In contrast, FIG. 2 shows a second embodiment in which the lubricant feeder is dispensed with. This embodiment is suitable for material that already has sufficient frictional properties, such as comminuted food waste or pasty food mass. The system is used, for example, to convey food waste over long distances, for example to a remote biogas plant. The food waste or the food mass passes through a long conduit 8 to the illustrated storage 20.

Several process steps for treating food waste for incineration in a biogas plant can be integrated into this system in a very small space. The eccentric screw pump 1, in turn, is a hopper pump that differs from the eccentric screw pump shown in FIG. 1A in that a comminution device 19 is provided that, in the illustrated embodiment, is integrated into the eccentric screw pump, for example between the hopper 21 and the stator 2. It is a cutting tool and/or with a cutting tool, so that the material that is introduced, for example whole fruits or vegetables and/or residues, is comminuted and then pumped into the conduit 8 as a pasty food mass. Apart from the lubricant supply, the equipment is otherwise constructed the same as in FIGS. 1A to 1D and is also operated in the same manner.

As already mentioned, the eccentric screw pump is preferably a hopper pump in the illustrated embodiments. One possible embodiment is shown in FIG. 4. The drive 9 operates via a coupling rod 22 on the rotor 3, with the coupling rod 22 being provided in the embodiment with a conveying tool 26, for example a screw, in order to convey the material along the rotor or stator. The coupling rod 22 is connected via an input-side joint 23 to the drive and/or a drive shaft or connecting shaft 24 and via a rotor-side joint 25 to the rotor 2, so that eccentric movement of the rotor 3 is enabled or realized by the coupling rod 22 and the swivel joints 23, 24.

The eccentric screw pump 1 is a so-called easy-maintenance pump in which both the stator 2 and the rotor 3 can be exchanged without removing the suction housing 4 and without removing the housing 6 and the connected lines, and particularly also without removing the hopper 21. In the embodiment, the stator 2 is longitudinally divided and consists for example of two stator halves. Details are not shown. The stator casing 27 surrounding the elastomeric stator preferably consists of a plurality of casing segments that form a stator clamp on the one hand and enable easy disassembly and easy replacement of the stator on the other hand. Moreover, the rotor 3 can be connected via an additional separation point to the rotor-side coupling joint, enabling the rotor 3 to be replaced without joint separation. Details are not presented in this respect, either, but the known concepts can be gleaned overall from US 2011/0061403, US 2017/0306760, US 2017/0268505, or U.S. Pat. No. 8,439,659.

We claim:

1. A system for conveying pasty material through a conduit, the system comprising:
   an eccentric screw pump having an elastic stator, a rotor that rotates in the stator, a housing with an intake port, and an output port connected to the conduit;
   drive means for rotating the rotor and thereby drawing the pasty material in through the intake port and expelling the drawn-in material as a continuous compressed-material strand into the conduit; and means including a valve for supplying compressed-air pulses to the conduit at time intervals for separating the compressed-material strand into spaced-apart material plugs of limited length and for pushing the spaced-apart material plugs with the compressed air through the conduit.

2. The conveying system defined in claim 1, wherein the eccentric screw pump is a hopper pump having a feed hopper connected to the intake port, drive means having a coupling rod with conveying tools connected to the rotor.

3. The conveying system defined in claim 1, wherein the conduit has a length of greater than 25 meters, the system further comprising:

storage connected to a downstream end of the conduit.

4. The conveying system defined in claim 1, further comprising:

a controller connected to and controlling the valve.

5. The conveying system defined in claim 1, further comprising:

a pressure sensor connected to the conduit and to the controller for opening and closing the valve as a function of pressure in the conduit measured by the pressure sensor.

6. The conveying system defined in claim 1, further comprising:

a lubricant feeder connected to the conduit between the eccentric screw pump and the supplier of pressure medium for injecting a lubricant into the conduit upstream of where the compressed air is injected into the conduit.

7. The conveying system defined in claim 6 wherein the lubricant is injected into the conduit upstream of the valve and downstream of the pump.

8. The conveying system defined in claim 1, wherein the eccentric screw pump is provided with a comminuter for the material being conveyed for comminuting whole fruits and vegetables in the material.

9. The conveying system defined in claim 1, wherein the stator is longitudinally divisible for exchange of the rotor without removal of the housing.

10. The conveying system defined in claim 1, wherein the rotor is removable from the pump without removing the housing.

11. A method of conveying pasty material through a conduit, the method comprising the steps of:

pumping the material with an eccentric screw pump into an upstream end of the conduit to form therein a continuous compressed-material strand moving downstream; and injecting a pulse of compressed air into the conduit to subdivide the strand into a succession of spaced-apart material plugs of limited length and to push the spaced-apart material plugs with the compressed air downstream in the conduit.

12. The method defined in claim 11, further comprising the step of:

monitoring a pressure in the conduit and injecting a one of the pulses of compressed air into the conduit when the monitored pressure exceeds a predetermined limit.

13. The method defined in claim 12, wherein the limit is 5 bar.

14. The method defined in claim 12, wherein a duration of each pulse is a function of the monitored pressure.

15. The method defined in claim 11, further comprising the step of:

injecting a lubricant into the conduit generally at the upstream end thereof.

16. The method defined in claim 15, wherein the lubricant is injected into the conduit upstream of where the compressed-air pulse is injected into the conduit.

17. A method of conveying pasty material through a conduit at least 25 m long, the method comprising the steps of:

pumping the material with an eccentric screw pump into an upstream end of the conduit to form therein a continuous compressed-material strand moving downstream; and injecting a pulse of compressed air into the conduit at a pressure of at most 5 bar to subdivide the strand into a succession of spaced-apart material plugs of limited length that are pushed by the compressed air downstream in the conduit.

18. A system for conveying pasty material through a conduit at least 25 m long, the system comprising:

an eccentric screw pump having an elastic stator, a rotor that rotates in the stator, a housing with an intake port, and an output port connected to the conduit;

drive means for rotating the rotor and thereby drawing the pasty material in through the intake port and expelling the drawn-in material as a continuous compressed-material strand into the conduit; and means including a valve for supplying compressed-air pulses at a pressure of at most 5 bar to the conduit at time intervals for separating the compressed-material strand into spaced-apart material plugs of limited length and for pushing the spaced-apart material plugs with the compressed air through the conduit.

* * * * *